Oct. 24, 1950
P. SCHROEDER
2,527,036
LOG HANDLING MECHANISM
Filed June 6, 1949
2 Sheets-Sheet 1
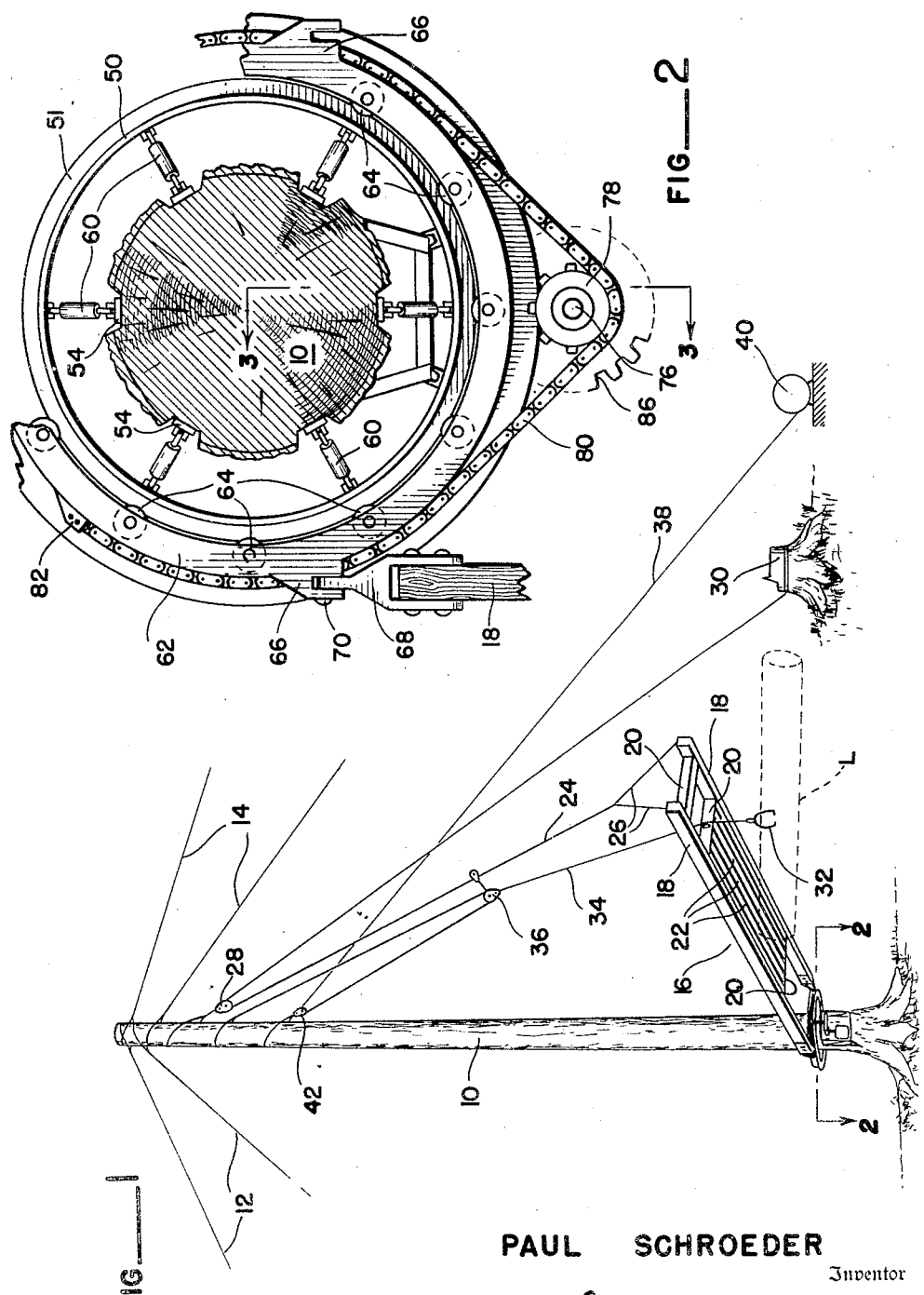
PAUL SCHROEDER
Inventor
By Smith & Tuck
Attorney Oct. 24, 1950     P. SCHROEDER     2,527,036
LOG HANDLING MECHANISM
Filed June 6, 1949     2 Sheets-Sheet 2
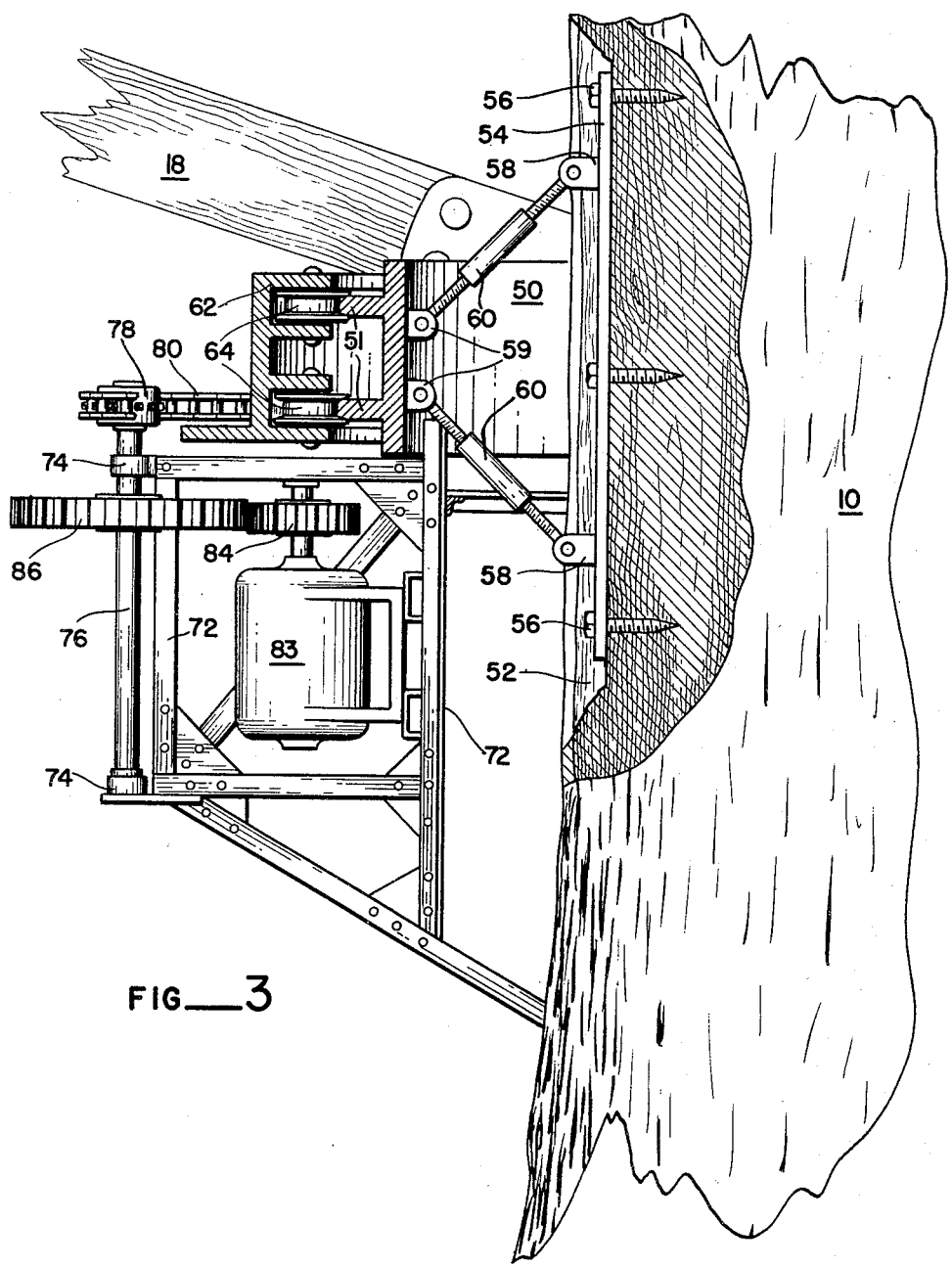
FIG_3
PAUL SCHROEDER
Inventor
By Smith & Tuck
Attorney Patented Oct. 24, 1950

2,527,036

UNITED STATES PATENT OFFICE 2,527,036

LOG HANDLING MECHANISM

Paul Schroeder, Clallam Bay, Wash.

Application June 6, 1949, Serial No. 97,474

4 Claims. (Cl. 212—58)

This invention relates to improvements in a log handling mechanism and, more particularly, is the provision of means for raising and swinging logs in connection with yarding and loading of them for transportation.

In the logging industry it is customary in the Pacific slope area to cut trees into what are known as double-length logs that are about 40 feet long. These logs are usually of substantial diameter and therefore are heavy and unwieldy. To handle them in a collection yard and to raise and deposit them on a truck or railroad car is a difficult undertaking for these and other obvious reasons. To facilitate such operations, the loggers have devised the system of topping a large and straight tree to form a mast which may be suitably guyed to steady it. Near the base of the tree and outstanding at an upward inclination to the ground is mounted a boom, which can be swung about the axis of the tree from side to side and which can be elevated. In view of the size of the logs being handled and the hard and rough work that is being accomplished, these booms are often formed of two substantially parallel timbers that are spaced apart by cross-pieces a distance sufficient to straddle on the inner end of the base of the tree. By means of cables such a boom is suspended in place and is rigged with lifting lines and with swinging lines that are connected to power winches whereby the boom may be swung over a log to be lifted, then when the log is engaged by tongs on the lifting line and lifted, swung to another position as over a truck bed for the deposit of the log.

Usually such booms are rather loosely mounted on their inner ends to the spar or mast tree by the straddle arrangement mentioned and by a retaining line that passes around the tree on the other side from the boom. When such a boom is swung while a heavy and long log is suspended from the outer end, a great frictional contact exists between the boom and mast tree and the power required, as a result, is very considerable—often in excess of that available. Such arrangements can be seen in the patents to Nord et al., No. 1,313,198, or Tsigris, No. 1,551,225, which are early constructions used in the logging field.

It has been my further experience in logging operations that the practice of swinging the boom by means of auxiliary swinging lines, results in lost time because the cables become fouled and tangled with guys, they are dangerous to the workmen since often they lie on the ground during slack periods but become alive and deadly when power is applied, and they require additional winch drums on the power unit beyond absolute necessity.

To avoid the disadvantages of the prior practices and to materially facilitate the operation of yarding and loading logs, I have formed a boom stick of two heavy timbers that are tied together by relatively heavy cross pieces in a spaced-apart relation sufficient to enable their inner ends to straddle the spar tree near its base. I mount on the spar tree an annular track and an annular carriage to move on the track. The carriage is coupled to the boom stick so that the latter moves with the carriage and swings relative the carriage at diametrically opposite points of the spar tree. This permits the boom stick to be radially positioned as desired around the tree and to be altered in its inclined position to the ground around the tree to accommodate varying lifting conditions that may exist. To insure that the mounting of the track and carriage is such that the carriage may be moved easily even when considerable weight is supported by the boom stick, I provide means for coupling the track to the spar tree that allows adjustment and accurate leveling of the carriage track. Means is also provided for moving the carriage on the track but without employing hauling lines on the boom. In this way, I am able to provide a simple and easily produced and installed assembly of a spar tree and boom that will operate efficiently under extreme conditions of use with relatively small amounts of power, with safety to the workmen, with rapidity, and with a minimum of maintenance during use.

The construction and combination of elements by which these concepts are carried out and by which these and other objects are effected are fully shown and described in the following specification and the accompanying drawings, in which:

Figure 1 is perspective schematic view of a spar tree rigged and adapted according to my invention for use in a logging operation;

Figure 2 is an enlarged horizontal cross-section through the tree of Figure 1 on line 2—2 thereof and showing in plan view the carriage and track arrangement used between the spar tree and boom, a portion being broken away for convenience of illustration; and Figure 3 is a vertical view, partially in section, taken in the plane suggested by line 3—3 of Figure 2.

Referring to Figure 1, there will be seen a typical spar tree 10, which is usually a tree in place that has had its branches removed and has been topped and guyed by lines of cable 12 and 14. The ends of the guys (not shown) are carried out laterally around the spar tree and fastened to convenient stumps or objects buried in the ground. Such guys tend to make the spar tree rigid to form an excellent support for the boom 16.

The boom comprises a pair of elongated timbers 18, 18 of substantial size which are separated by cross bars 20 and joined together by through bolts in a conventional manner. The under face of the boom 16 is sheathed with straps of metal 22 against which the loggers "heel" a log L during its travel about the tree from one side to another. The boom 16 is supported in a generally flat condition from the side of the spar tree by a cable 24, attached to the boom by bridle 26, which passes upward and around a sheave of block 28 and then to the anchoring stump 30 off to one side of the spar tree.

I prefer to lift logs by means of tongs 32 on line 34, which is attached to block 36 that is slidably coupled to line 24 as shown in Figure 1. The main lifting line 38 runs from engine winch 40 up to and around the block 42 on the spar tree, down through block 36, and thence upward to a suitably high anchoring point on the spar tree 10. By this arrangement, when a pull is exerted on line 38, the spacing between blocks 36 and 42 is lessened and a pull on the tong-line 34 is exerted to cause the lifting of a log L into contact with the boom in the manner described.

The boom swings around the spar tree to various radial positions during a loading operation and to facilitate this action, the means shown in Figures 2 and 3 has been devised. An annular track 50 having vertically spaced-apart rails 51 is mounted around the spar tree near its base. This track is preferably formed of steel and is quite heavy and strong to stand the rugged forces to which it is subjected. It is desirable that the track be mounted level about the tree or, on occasion, that the track have a slight tilt with respect to horizontal, for reasons described hereafter.

To attain the mounting of the track on the tree, I chop away the bark and down to the solid wood underneath to form flat bottomed recesses 52 on which are placed pads, as 54. Lag screws 56 anchor the pads to the tree. The pads have ears 58 on them and the inner face of the track 50 has a plurality of similar ears 59, the latter being relatively close together vertically while the former are widely separated one above the other. Between an ear 58 and ear 59 is mounted an extensible-contractible link 60 of the nature of a turnbuckle.

When the pads have been properly positioned on the spar tree, and the ring has been assembled about the tree, it is lifted into place and the links 60 are connected and adjusted as to length to bring the track 50 into the desired position relative to the ground. It is desirable that the ends of the links 60 that attach to the tree pads be rather widely spread apart—in other words, that the links of each pair diverge—in order that a broad or wide base for the track be provided.

The carriage frame 62 encircles track 50 and rides on the rails thereof by means of a plurality of wheels 64. Between the carriage frame 62 and each of the ends of the elongated timbers 18 of the boom is a pivotal coupling which comprises the forks 66 into which is fitted the boom forks 68 that are attached to the boom. The pivot pins 70 of the opposite connections are co-axial and are disposed far enough apart to easily move about the tree as the boom swings.

On a supplemental frame 72 by means of bearing 74 I mount the pillar shaft 76 which has a rotary drive sprocket 78 on its upper end adjacent to the carriage frame 62. A sprocket chain 80 anchored at its ends as at 82 passes around a substantial portion of the carriage and around the sprocket. Chain 80 is in effect a flexible strand and it is contemplated that equivalent, but not identical power transmitting means, may be employed to rotate the carriage on the track.

Also on framework 72 is mounted a motor 83 which powers pinion 84 in mesh with spur gear 86 on shaft 76. It is preferable that motor 83 be of the reversible type so that the carriage may be moved in either direction.

Usually the control means for the operation of motor 83 is conducted off to one side close to the control for the winch spool 40. The operator is then located to one side where he can view the operation and cause the functioning of the various elements according to requirements of the job.

On occasion the track 50 may be placed slightly non-horizontal so that, when the motor is operating to revolve the boom to the spot where logs are to be picked up, the motor is driving the empty boom up-hill, as it were. Then when a log is added to the load of the boom the carriage can coast down-hill to the position where the log is deposited. Such an arrangement shows the versatility of my mechanism.

I claim:

1. In a log handling mechanism of the type including a spar tree and a boom supported from said spar tree and formed of a pair of spaced-apart elongated members adapted to straddle said spar tree near its base, an operating connection between the spar tree and the boom member, comprising: means forming an annular track horizontally disposed about the spar tree; an annular carriage frame encircling said track and movable thereon; means forming a pivotal connection between said carriage frame and the inner ends of each of the spaced-apart elongated members of the boom, operable about a generally horizontal axis, said pivotal connections being co-axial; an upright-axis rotary member adjacent said carriage frame and supported in fixed position from said spar tree by frame means; a flexible strand anchored at its ends to said carriage member and passing around said rotary member; and means to rotate said rotary member in either direction about its axis to impart movement of said carriage on the track to swing the boom to selected radial positions relative the spar tree.

2. The construction according to claim 1 in which the upright-axis rotary member is a sprocket and the flexible strand is a sprocket chain.

3. The construction according to claim 1 in which the member forming the annular track has a pair of vertically spaced-apart rails and the carriage frame includes plural pairs of flanged wheels to roll on said rails.

4. The construction according to claim 1 in which the annular track is somewhat larger than the outer diameter of the spar tree, the spar tree has several base pads secured thereto at the position of the track, and between each pad and the track there is a pair of end pivoted extensible-contractible screw links whose ends attached to the pads diverge with respect to their relation at the ends attached to the track.

PAUL SCHROEDER.

No references cited.